United States Patent [19]

Belart

[11] Patent Number: 4,508,008
[45] Date of Patent: Apr. 2, 1985

[54] HYDRAULIC BRAKE BOOSTER

[75] Inventor: Juan Belart, Walldorf, Fed. Rep. of Germany

[73] Assignee: ITT Industries, Inc., New York, N.Y.

[21] Appl. No.: 375,256

[22] Filed: May 5, 1982

[30] Foreign Application Priority Data

Jul. 17, 1981 [DE] Fed. Rep. of Germany ....... 3128317

[51] Int. Cl.³ .............................................. F15B 9/10
[52] U.S. Cl. ....................................... 91/372; 91/383;
91/388; 91/460; 60/547.1
[58] Field of Search ...................... 66/547.1, 548, 551;
91/368, 383, 370, 371, 372, 373, 434, 460, 388

[56] References Cited

U.S. PATENT DOCUMENTS 2,391,819 12/1945 Creson ................................. 91/368

FOREIGN PATENT DOCUMENTS 1234957 5/1960 France ................................. 91/383

Primary Examiner—Paul E. Maslousky
Attorney, Agent, or Firm—James B. Raden; Edward J. Brosius

[57] ABSTRACT

A hydraulic brake booster includes a booster piston axially slidable in a bore of a housing and delimiting therein a boosting compartment, and a brake pedal responsive operating element which partially extends into the boosting compartment to act as a plunger therein. A control valve has a valve body which is stationary relative to the housing and a valve member which is slidably received in the valve body and controls communication of a pressure chamber with sources of control fluid at reference pressure and at control pressure, the pressure in the boosting compartment being proportionate to the pressure in the pressure chamber. A flexible elongated tubular element equidistantly interconnects the valve body with the booster piston, and an elastic body of substantially constant length, such as a cable, elastic rod, or a body of incompressible liquid, which is at least partially received in the tubular element, converts the displacement of the operating element relative to the booster piston into movement of the valve member relative to the valve body and thus controls the pressure in the boosting compartment. The pressure chamber may be filled with liquid and directly be connected with the boosting compartment, or it may be constituted by one of the two chambers of a vacuum booster having a movable wall separating the two chambers from one another and connected to a piston received in a bore containing boosting liquid and communicating with the boosting compartment.

6 Claims, 3 Drawing Figures

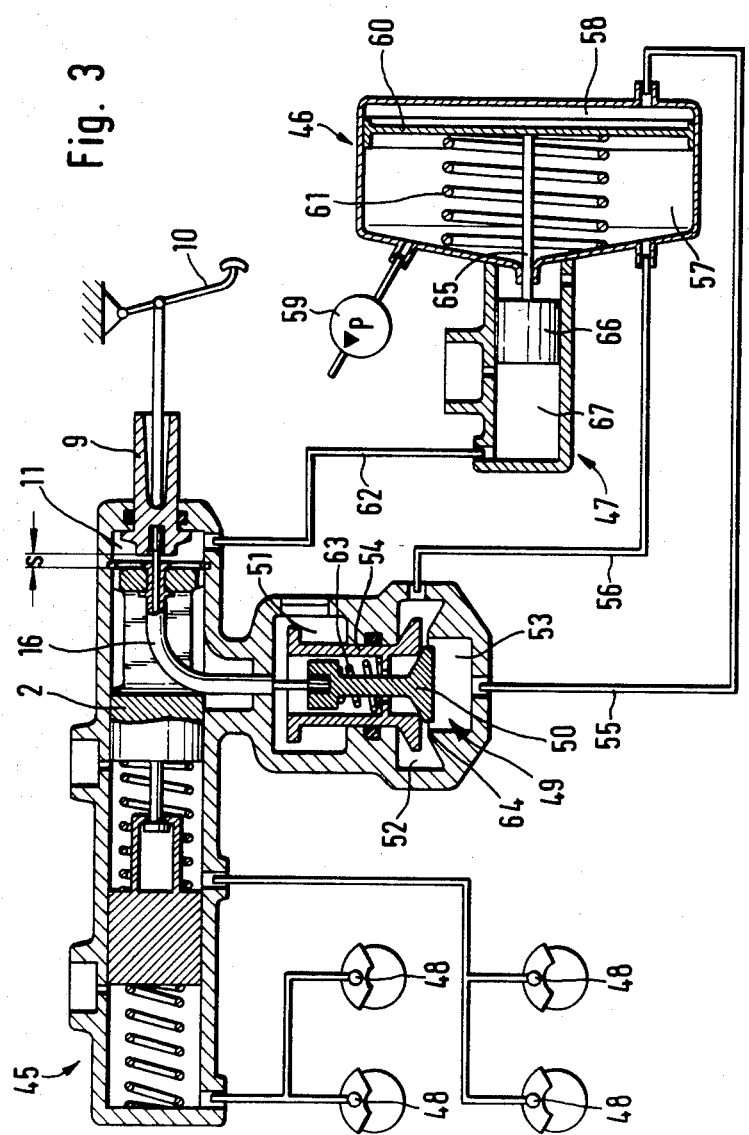

HYDRAULIC BRAKE BOOSTER

BACKGROUND OF THE INVENTION

The present invention relates to a hydrualic booster in general, and particular to a hydraulic booster for the actuation of a master cylinder arrangement of a vehicle brake system.

Various hydrualic brake booster constructions are already known, among them such including a booster piston and a stationary brake valve which is located separately from the booster piston and which serves for the selective control of the communication between a pressure chamber and either a pressure source or an unpressurized reservoir. In such constructions, there is usually interposed between a pedal-operable operating element or piston rod and a control device of the brake valve a device operative for the transmission of the control stroke of the piston rod. Resilient means may further be provided for causing the brake valve to adopt a position in the brake-released position in which the pressure chamber and the unpressurized reservoir are in communication.

Hydraulic brake boosters are known and widely used for the actuation of master cylinder pistons of vehicular brake systems, in which the brake valve is arranged in the booster piston. The booster piston has a circumferential groove which, together with the housing, forms an annular chamber communicating with the pressure source. Upon the application of force to the piston rod, which is coupled with the valve spool of the brake valve, the valve spool will be displaced relative to the brake valve housing so as to interrupt the communication between a pressure chamber and an unpressurized reservoir and to bring radial bores in the valve housing and in the brake valve into coincidence, so that pressurized medium enters the pressure chamber. An important disadvantage of such hydraulic brake boosters is the need of providing sealing means at the booster piston which are permanently exposed to the pressure of the pressure source. Such high-pressure seals exert considerable frictional forces on those parts which are in contact with them; thus a relatively high pressure must be initially built up in the pressure chamber before any movement of the booster piston occurs. During this stage of control, a considerable reaction force caused by the pressurization of the piston rod may already be felt at the brake pedal, although no braking pressure has been built up as yet in the master cylinder arrangement. Once the pressure required for the breaking away of the booster piston has been built up in the pressure chamber, the booster piston will abruptly start moving and effect a correspondingly quick build-up of a relatively high braking pressure in the master cylinder arrangement and hence in the brake system. This will interfere with smooth and convenient operation in the range of relatively weak braking actions as a sensitive control of the braking force is hardly possible in this range. Relatively strong compression springs are required for the return of the booster piston since they must be able to overcome the adhesive forces of the high-pressure seals. Such springs are relatively heavy.

A brake booster of this type which, however, avoids the aforementioned disadvantages is disclosed in the German published patent application DE-OS No. 23 64 111. This hydrualic brake booster has a piston rod connected with a brake pedal, the end of the piston rod which faces away from the brake pedal projecting into the booster chamber and being received by a blind bore of the booster piston. The booster piston has an extension. A lever is supported on this extension in a tiltable manner; the other end of this lever is fastened to the brake valve. A pivot is provided between the point of support of the lever and the lever end which is fastened to the brake valve. The pivot is supported on a holding device which is displaceable on the piston rod and which is kept in a pedal-remote position by force of a spring.

In this known arrangement it must be considered a disadvantage that the axes of the brake valve and of the booster piston can be only be arranged substantially parallel to each other or, in other words, that it is impossible to freely select the angle enclosed by these axes.

SUMMARY OF THE INVENTION

Accordingly, it is a general object of the present invention to avoid the disadvantages of the prior art.

More particularly, it is an object of the present invention to so construct a hydraulic booster as not to possess the drawbacks of the conventional boosters of this type.

It is yet another object of the present invention to provide a hydraulic booster of the type here under consideration in which the angle between the axis of movement of the booster piston and the axis of movement of the valve member of a control valve can be selected at will.

Still another object of the present invention is to so design the brake booster of the above type that any seals of the booster piston are not exposed to high-pressure hydrualic fluid at all times.

A concomitant object of the present invention is to develop a hydraulic brake booster which is simple in construction, light in weight, easy to operate, and reliable nevertheless.

In pursuance of these objects and others which will become apparent hereafter, one feature of the present invention resides in a hydraulic booster, especially for use in actuating a master cylinder arrangement of a vehicle braking system, in a combination comprising a housing defining an elongated bore; a booster piston received in the bore for longitudinal displacement; an operating element mounted for selective translation relative to the housing between a rest position and a plurality of operating positions; means for defining a pressure chamber; means for supplying a fluid at a controllable pressure into the pressure chamber, including a control valve body, preferably stationarily mounted on the housing, and having an elongated internal passage and at least one outlet and at least one inlet port communicating with the passage, means for admitting the fluid to one of the ports at a control pressure, a control valve member accommodated in the passage for movement longitudially thereof between an inactive position in which it establishes communication only between the outlet port and the pressure chamber and a plurality of active positions in which it establishes communication between the inlet port and the pressure chamber, and means for connecting the outlet port with the pressure chamber; and means for moving the control valve member between the inactive and active positions thereof relative to the control valve body in dependence on the position of the operating element relative to the booster piston, including an elongated, preferably flexible, tubular element having two longitudinally spaced portions respectively secured to the booster piston and to the control valve body, and a deformable elongated force transmitting body of substantially constant length at least partially received in the tubular element for displacement relative thereto and operatively connected to the operating element and to the control valve member for joint movement therewith such that the control valve member is in its inactive position when the operating element is in its rest position.

A particular advantage achieved when the booster is constructed in this manner is that it is possible to provide the control valve always at a location which is most appropriate due to the conditions of assembly. In particular, in motor vehicles, this will be a great advantage in view of the high degree of compactness with regard to the assembly of the remaining units. It will be advantageous to insert a cable element into the tubular element which cable element may be exposed to tension and pressure in the axial direction, or to insert an elastic rod which will transmit tensile and compressive forces in the axial direction.

An advantageous construction is obtained when the ends of the tubular element are designed as cylinders, when pistons which are respectively connected with the valve member of the control valve and with the operating element are guided in these cylinders, and when the axial bore of the tubular element between the pistons is filled with pressure fluid. In this case, the actuation of the brake pedal will be hydraulic. Upon application of an operating force on the brake pedal, the piston connected with the operating element or piston rod will be moved further into its associated cylinder. Thus the pressure fluid within the guide hose will be displaced in the direction of the control valve. The piston fastened to the control valve will thus automatically travel a distance which will correspond to the distance travelled by the piston rod relative to the booster piston if the cylinder diameters are the same.

A construction of a particularly simple design will be obtained if the pressure chamber has communication with a piston-cylinder unit operable by a vacuum booster. A boosting pressure will be generated by the piston-cylinder unit only upon application of the brake, the boosting pressure being supplied to the pressure chamber of the hydraulic brake booster. A high-pressure acumulator as well as a high-pressure accumulator loading pump can be dispensed with, resulting in a particularly cost-saving construction. If a vacuum booster is used for the pressure generation, it will be especially advantageous to design the brake valve as double seat valve which will establish communication between the chambers of the vacuum booster and a vacuum source in the brake release or inactive position while it will supply air to the chamber remote from the piston-cylinder unit in the brake-application or active position.

BRIEF DESCRIPTION OF THE DRAWING

Above-mentioned and other features and objects of this invention will become more apparent by reference to the following description taken in conjunction with the accompanying drawing, in which:

FIG. 3 is a view corresponding to that of FIG. 1 but of a brake system with a hydraulic brake booster and a vacuum booster.

DETAILED DESCRIPTION OF THE PREFERRED EMBODIMENTS

Figure 1:
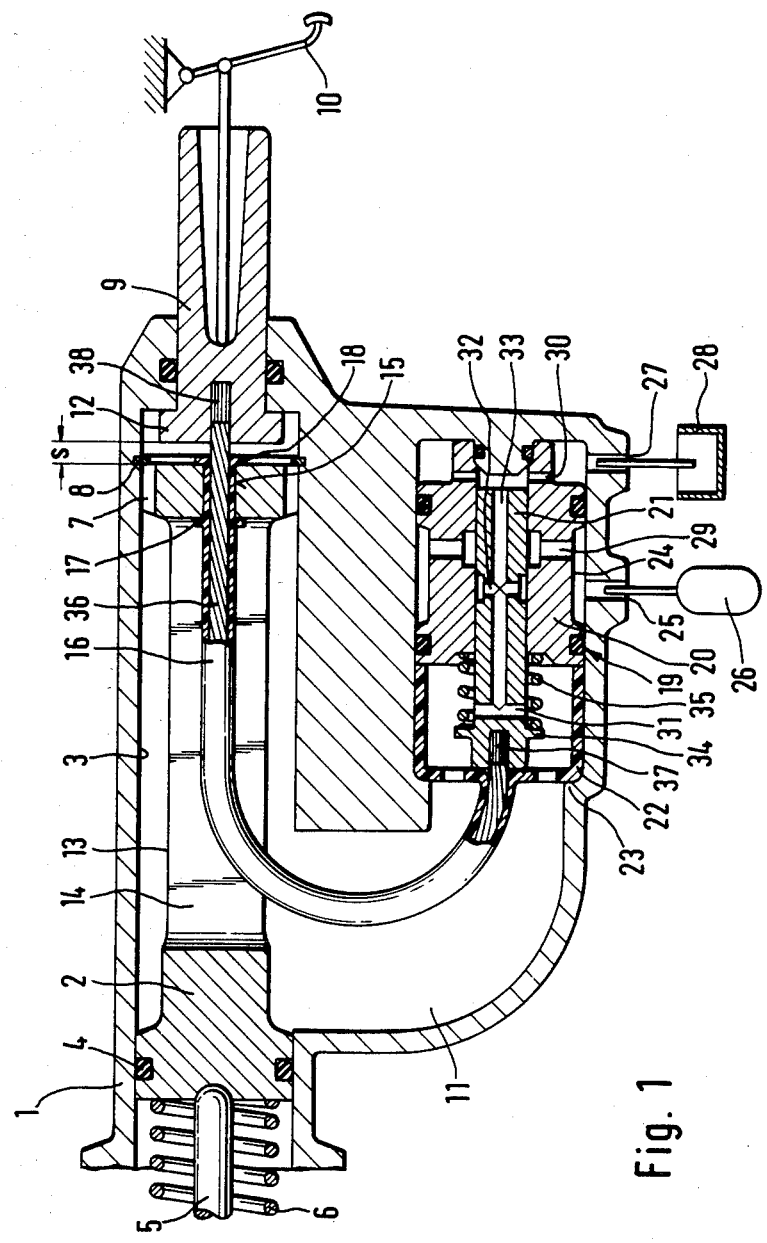
FIG. 1 is a longitudinal sectional view of a hydraulic brake booster with mechanical control valve actuation.

Referring now to the drawing in detail, it may be seen that parts corresponding to one another are identified by identical reference numerals in all Figures.

In FIG. 1, the numeral 1 defines a housing wherein a bore 3 is provided which receives a booster piston 2. At its left end, as considered in the drawing, the booster piston 2 has a gasket 4 and is connected with a non-illustrated master cylinder by means of a push rod 5. A compression spring 6 is provided for the return of the booster piston 2 into the brake-release position. The right front face of the booster piston 2, as considered in the drawing, has axial passages 7 at its outer circumference and abuts a housing stop 8 in the illustrated brake-release position. A piston rod 9 is provided coaxially with respect to the booster piston 2. One end of the piston rod or operating element 9 passes out of the housing 1 in a sealed manner and is connected with a brake pedal 10. The other end of the piston rod 9, which projects into a boosting compartment 11 of the brake booster, has a collar 12 directed radially outwardly and abutting the housing 1 in the brake-release position. In the illustrated rest position, the right front face of the booster piston 2 and the left front face of the piston rod 9 face each other at an axial distance s. The periphery of the booster piston 2 has a radial groove 13. Thus, only sections of the periphery of the booster piston 2 in the area of the front faces come into contact with the wall of the bore 3. A longitudinal groove 14 is provided in the areas of the booster piston 2 which are guided within the bore 3.

An axial bore 15 leads from the right front face of the booster piston 2 as considered in the drawing into the longitudinal groove 14 and receives one of the ends of a guide hose or tubular element 16. This end of the guide hose 16 has axial projections 17, 18 for securing the guide hose 16 against axial displacement in the axial bore 15. The free end of the guide hose 16, which emerges from the booster piston 2, extends to a control valve 19 comprising a valve housing or body 20 and a valve spool or member 21. The end of the guide hose 16 which is situated at the brake valve 19 merges into a rotationally symmetrical guide member 22 confined between the valve housing 20, on the one hand, and projections 23 of the housing 1, on the other hand. In this way, the stationarily supported valve housing 20 is kept in a defined position in respect of one of the ends of the guide hose 16 and a pressure chamber is defined between the valve housing 20 and the guide member 22. The valve housing 20 has a radial groove 24 which communicates with a control pressure source 26 via a inlet port 25. Another port 27 of the hydraulic brake booster communicates with an unpressurized reservoir 28. Radial channels or ports 29, 30 in the valve housing and radial channel 31, or ports 32 and an axial bore 33 in the valve spool 21 ensure the communication of the boosting compartment 11 with either the pressure source 26 or with the unpressurized reservoir 28 in dependence on the position of the valve spool 21 with respect to the valve housing 20.

The left end of the valve spool 21 as considered in the drawing has a collar 34 which supports a compression spring 35 resting against the valve housing 29. Owing to the force of the compression spring 35, the valve spool 21 of the brake valve supports itself at the guide member 22, thus adopting a position in which the boosting compartment 11 communicates with the port 27 and with the unpressurized reservoir 28 via the radial bore 31, the axial bore 33, and the radial bore 30 in the valve housing 20.

Either a cable element 36, which may be exposed to the tension and pressure, or an elastic rod, which will transmit tensile and compressive forces, is guided in the guide hose 16 and is connected by means of connecting elements 37, 38 with the piston rod 9, on the one hand, and with the valve spool 21 of the brake valve 19, on the other hand.

Having described the construction of the hydraulic brake booster of FIG. 1, its mode of operation will now be explained in more detail. When an operating force is applied to the brake pedal 10, the piston rod 9 is displaced to the left as considered in the drawing so that the axial distance s between the booster piston 2 and the piston rod 9 is reduced. This control stroke of the piston rod 9 will be transmitted by the cable element 36 to the valve spool 21 of the brake valve 19. Thus initially the communication between the boosting compartment 11 and the unpressurized reservoir 28 will be interrupted, followed by establishment of communication between the boosting compartment 11 and the pressure source 26. The pressure supplied into the boosting compartment 11 will act on the effective surface of the piston 9. Thus, a corresponding reaction force will be felt at the brake pedal 10. Furthermore, pressure will act on the right front face of the booster piston 2 as considered in the drawing. Once the pressure in the boosting compartment 11 has reached a level necessary to overcome the adhesive friction forces applied by gasket 4, a leftward movement of the booster piston 2 will ensue. Thereby the axial distance s between the booster piston 2 and the piston rod 9 will increase, the valve spool 21 of the brake valve 19 being caused to correspondingly recede as a result of the relative displacement of cable element 36 in guide hose 16. Thus, in each condition of the brake, it is possible to achieve an increase or reduction of the pressure in the boosting compartment 11 in dependence on the force acting on the piston rod 9, with the axial distance s remaining substantially the same. In the brake-release position, the valve spool 21 of the brake valve 19 will return into its inactive position in which the boosting compartment 11 is pressure-relieved by communicating with the unpressurized reservoir 28 which constitutes a source of reference pressure.

Figure 2:
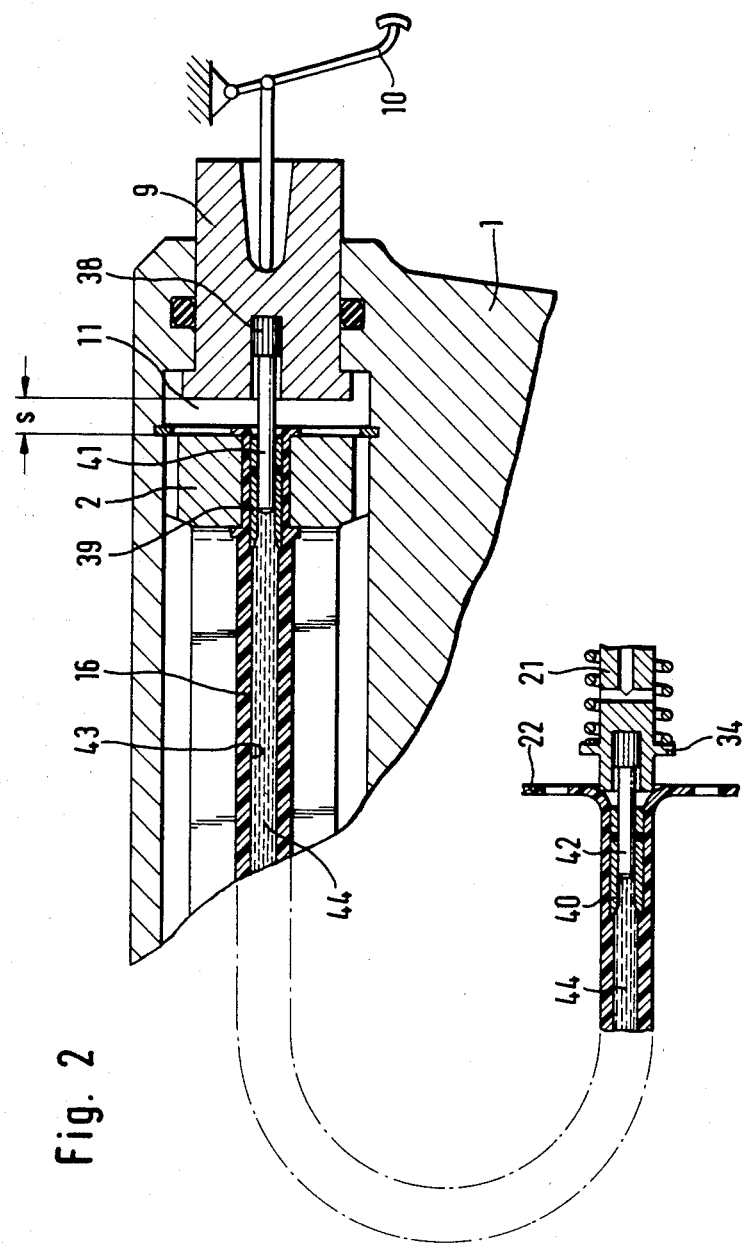
FIG. 2 is a partial view corresponding to slot of FIG. 1 but of a hydraulic brake booster with hydraulic actuation of the control valve.

In FIG. 2 of the drawing, respective cylindrical elements 39, 40 are inserted into associated ends of the guide hose 16. Pistons 41, 42 are displaceably guided in the cylindrical elements 39, 40. A connecting piece 38 firmly anchors the piston 41 to the piston rod 9 by means of the end of the piston 41 which extends away from the guide hose 16. The piston 42 is axially immovably supported in the valve spool 21 of the brake valve 19. An axial bore 43 of the guide hose 16 is filled with a body of pressure medium 44. When a force acts on the piston rod 9, there will be again an initial reduction of the axial distance s, so that the piston 41 plunges more deeply into the cylindrical element 39 and displaces the pressure fluid 44 towards the control valve 19. The result of the displacement of the pressure fluid 44 is that the piston 42 which is fastened to the valve spool 21 slides out of the cylindrical element 40 in proportion to the accomplished control stroke of the piston rod 9, whereby pressure medium is caused to enter the boosting compartment 11. In all other respects the functions of the constructions of FIG. 1 and FIG. 2 are the same, so that the explanations referring to the mode of operation of the construction of FIG. 1 also apply to FIG. 2.

In FIG. 3 there is shown a brake system which has a tandem master cylinder 45 and where, upon application of the brake, the pressure medium for the hydraulic brake booster will be provided by pressurizing the liquid supplied to the boosting compartment 11 by means of a vacuum booster 46 of generally conventional construction and a piston-cylinder unit 47. Wheel brakes 48 communicate with the tandem master cylinder 45. Further, the brake system comprises a control valve 49 designed as double seat valve. A valve member 50 is connected with the piston rod 9 of the hydraulic brake booster in the aforedescribed manner. The control valve 49 essentially comprises a housing divided into three chambers 51, 52, 53, the chamber 51 being in permanent communication with the atmosphere. In the illustrated inactive position of the control valve 49, the chamber 51 is separated from the chambers 52 and 53 by the closure member 50 and a tubular member 54 which in this position functions as valve seat, while the chambers 52, 53 communicate with each other. Two chambers 57, 58 of the vacuum booster 46 are thus communicating via conduits 55, 56 with a vacuum source 59 which thus constitutes a source of reference pressure. Consequently, the piston 60 of the vacuum booster 46 is pressure-compensated and is kept by the compression spring 61 in an initial position on the right. A connecting conduit 62 and the boosting compartment 11 are thus unpressurized.

When a force is applied to the brake pedal 10 in the just described brake assembly, there will again be a displacement of the piston rod 9, so that the axial distance s is reduced and the valve member 50 is correspondingly shifted due to the action of a compression spring 63 of the control valve 49. The tubular member 54 will follow the movement of the valve member 50 until the tubular member 54 comes to rest at a valve seat 64 of the control valve 49 to thereby interrupt the communication between the chambers 52, 53. Upon further movement of the valve member 50, the chamber 53 and thus the chamber 58 of the vacuum booster 46 will be supplied with atmospheric air, while vacuum will be maintained in the chamber 57 as before. It may thus be seen that the chamber 51 serves as a source of gaseous fluid, that is, air, at control pressure and that the chamber 58 constitutes a pressure chamber. Due to the action of this obtained pressure differential between the chambers 57 and 58, a movable wall or piston 60 of the vacuum booster 46 will move to the left as considered in the drawing and will displace a piston 66 of the piston-cylinder unit 47 via a piston rod 65. Thus, a pressure build-up will occur in a working chamber 67 of the piston-cylinder unit 47 which will propogate to the boosting compartment 11 via the conduit 62 and which will move the booster piston 2 to the left as considered in the drawing. In this manner, the axial distance s will be increased until a state of balance is achieved between the pedal force and the effect of the pressure in the boosting compartment 11. Once the force acting on the brake pedal 10 is removed or reduced, the valve member 50 of the brake valve 49 will lift the tubular member 54 off from its seat 64 so that again the same pressure prevails in the chambers 57, 58 of the vacuum booster 46. Consequently, the piston 66 will return into its right end position upon complete removal of the brake pedal force and there will be a complete decrease of the pressure in the working chamber 67 of the piston-cylinder unit 47 and in the boosting compartment 11.

While I have described above the principles of my invention in connection with specific apparatus, it is to be clearly understood that this description is made only by way of example and not as a limitation to the scope of my invention as set forth in the accompanying claims.

I claim:

1. In a hydraulic booster, especially for use in actuating a master cylinder arrangement of a vehicle braking system, a combination comprising:

a main housing defining an elongated bore;

a booster piston received in said bore for longitudinal displacement;

an operating element mounted partially in said bore for selective translation relative to said housing between a rest position and a plurality of operating positions;

means for defining a pressure chamber, said pressure chamber bounded at one end by a face of said operating element disposed in said bore, and bounded at the other end by a face of said booster piston;

means for supplying a fluid at a controllable pressure into said pressure chamber, including:

a control valve including a valve housing and a valve member movable therein, said valve housing having an elongated internal passage and at least one outlet and one inlet port communicating with said passage, means for admitting the fluid to one of said ports at a control pressure which differs by a predetermined amount from a nominal reference pressure at said other port, said control valve member accommodated in said passage for movement longitudinally thereof between an inactive position in which it establishes communication only between said outlet port and said pressure chamber and a plurality of active positions in which it establishes communication between said inlet port and said pressure chamber, and means for moving said control valve member between said inactive and active positions thereof relative to said control valve housing in dependence on the position of said operating element relative to said booster piston, said moving means including an elongated tubular element having two longitudinally spaced portions respectively secured to said booster piston and to a stationary guide within said main housing, and a deformable elongated force-transmitting body of substantially constant length at least partially received in said tubular element for displacement relative thereto and operatively connected to said operating element and to said control valve member for joint movement therewith such that said control valve member is in said inactive position when said operating element is in said rest position.

2. The combination as defined in claim 1, further comprising means for stationarily mounting said control valve housing on said booster housing at a location remote from said bore.

3. The combination as defined in claim 2, wherein said tubular element is of a flexible material.

4. The combination as defined in claim 1, wherein said force-transmitting body is a cable element having two longitudinally spaced portions respectively secured to said operating element and to said control valve member to transmit axially effective forces therebetween.

5. The combination as defined in claim 1, wherein said moving means further includes means for bounding respective pressure spaces at said portions of said tubular element, and respective pistons at least partially received in said pressure spaces and respectively secured to said operating element and to said control valve member; and wherein said force-transmitting body is a body of liquid filling the interior of said tubular element and said pressure spaces from one of said pistons to the other.

6. The combination as defined in claim 1; further comprising means bounding a channel connecting said bore of said housing with said control valve housing; and wherein said tubular element is received in said channel.

* * * * *